United States Patent
Marshall et al.

[15] 3,643,428
[45] Feb. 22, 1972

[54] FUEL CONTROL SYSTEM FOR A GAS TURBINE ENGINE

[72] Inventors: David Marshall; Arthur Leslie Lloyd, both of Wolverhampton, England

[73] Assignee: H. M. Hobson Limited, London, England

[22] Filed: July 24, 1970

[21] Appl. No.: 57,944

[52] U.S. Cl. .................................. 60/39.28, 137/81.5
[51] Int. Cl. ............................................. F02c 9/08
[58] Field of Search .......................... 60/39.28; 137/81.5

[56] References Cited

UNITED STATES PATENTS

| | | | |
|---|---|---|---|
| 3,293,858 | 12/1966 | Maljanian | 60/39.28 |
| 3,371,698 | 3/1968 | Hitzelberger | 60/39.28 |
| 3,403,509 | 10/1968 | Eastman | 137/81.5 X |
| 3,410,287 | 11/1968 | Heyden | 137/81.5 X |
| 3,540,214 | 11/1970 | Stirgwolt | 60/39.28 |

*Primary Examiner*—Clarence R. Gordon
*Attorney*—E. T. Le Gates and Martin Kirkpatrick

[57] ABSTRACT

A fuel supply system for a gas turbine engine which comprises a fluidic vortex valve which meters the flow of fuel delivered by a pump to the main burner of the engine, a governor controllable by the pilot which adjusts the pressure of fuel at the control port of the vortex valve to maintain during steady state conditions the engine at a speed determined by the governor, and means operable during periods of acceleration and when the flow through the control port of the metering vortex valve is saturated to vary the pressure drop across the metering vortex valve, as a function of engine speed and compressor pressure, so that the flow of fuel to the engine cannot exceed a limit permissible during acceleration.

5 Claims, 3 Drawing Figures

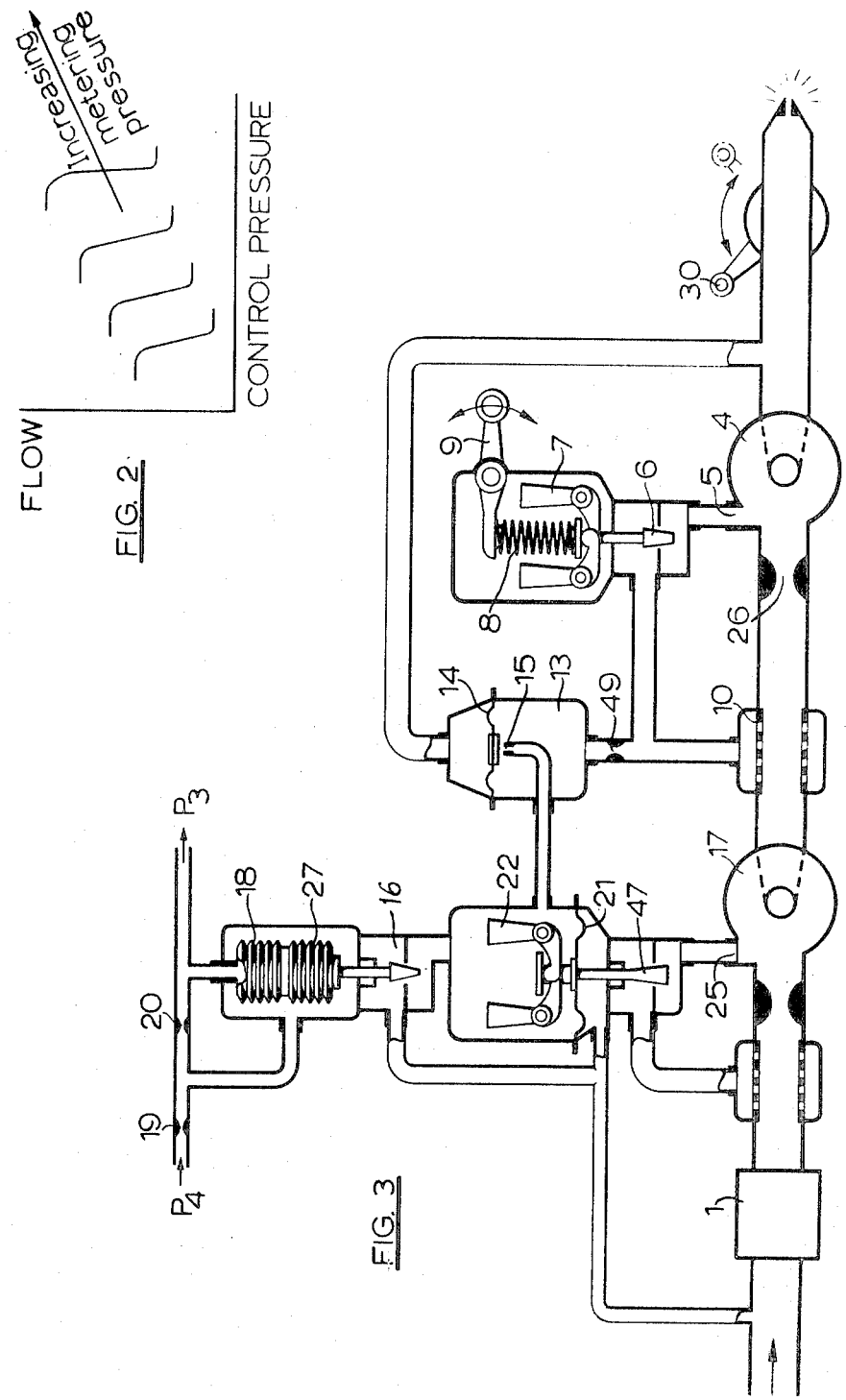

FUEL CONTROL SYSTEM FOR A GAS TURBINE ENGINE

This invention provides a fuel control system for a gas turbine engine which controls the engine speed to a value determined by the pilot under steady state conditions and also during conditions of acceleration and which schedules the maximum flow of fuel to the engine as a function of engine speed and compressor pressure in such a way as to ensure that the accelerating limits of the engine are not exceeded.

The fuel supply system according to the invention comprises a fluidic vortex valve which meters the flow of fuel delivered by a pump to the main burner of the engine, a governor controllable by the pilot which adjusts the pressure of fuel at the control port of the vortex valve to maintain during steady state conditions the engine at a speed determined by the governor, and means operable during periods of acceleration and when the flow through the control port of the metering vortex valve is saturated to vary the pressure drop across the metering vortex valve, as a function of engine speed and compressor pressure, so that the flow of fuel to the engine cannot exceed a limit permissible during acceleration.

The control during periods of acceleration may be effected by a fluidic pressure regulating vortex valve, which operates to return fluid from the delivery side to the suction side of the pump and the flow of fuel to the control port of which is controlled jointly by a governor and by a valve, the opening of which is controlled as a function of compressor pressure.

Alternatively the fluidic pressure regulating vortex valve may be situated in series with the pump and the metering vortex valve and be operative to throttle the flow of fuel to the metering vortex valve.

A fluidic vortex valve, as more fully described in U.S. application Ser. No. 875,934, now U.S. Pat. No. 3,598,137, consists of a flat disclike cylindrical chamber having an inlet providing for a radial flow of supply fluid into the chamber, an outlet providing for axial flow of fluid out of the chamber and a control inlet providing for tangential flow of control fluid into the chamber and has the characteristic that when the fluid is supplied to the control inlet at a certain pressure greater than the pressure of admission to the supply inlet a vortex flow will be established in the chamber with the result that the pressure drop between the supply inlet and the outlet is greatly increased for the same flow throughout. A small control flow can be utilized to control a large supply flow and the vortex flow can be controlled by modification of the control pressure.

A fluidic vortex valve has the advantages that, having no moving parts, it cannot be subject to failure arising from sticking and does not therefore require any actuating means of sufficient size to minimize the risk of sticking and so has the advantage of reduced size and weight. Another advantage is that there is a relatively large flow passage through the valve under all conditions which makes the valve insensitive to the detrimental effects of contamination in the fuel.

Two embodiments of the invention will now be described with reference to the accompanying drawings, in which:

FIG. 2 shows graphs illustrating the relation between fuel flow through a vortex valve and the control pressure applied to its control port, and FIG. 3 is a diagram illustrating the second form of fuel control system.

Figure 1:
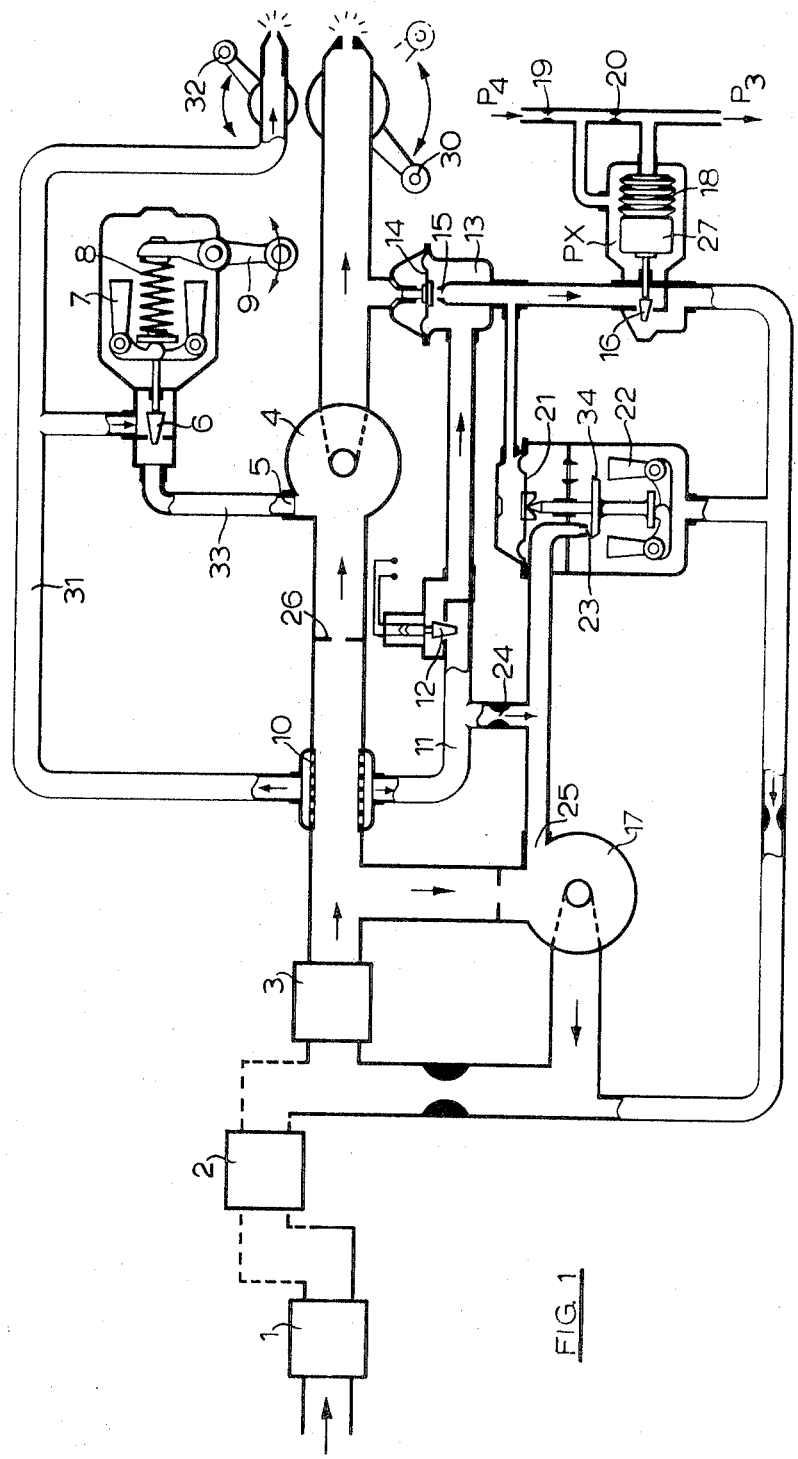
FIG. 1 is a diagram illustrating the first form of fuel control system.

The system illustrated in FIG. 1 makes use of two fluid vortex valves of the kind described in U.S. application Ser. No. 875,934, one, 4, acting as a metering valve and the other, 17, acting as a pressure regulating valve. Fuel from the aircraft fuel tanks is delivered via a centrifugal backing pump 1, an oil cooler 2, a positive displacement vane pump 3, a velocity cleaned filter 10, and a fixed orifice 26 to the vortex metering valve 4 and thence via a shutoff cock 30 to the main burner of the engine. Fuel also flows to the primary burner of the engine through a line 31 provided with a shutoff cock 32. The flow through the valve 4 is controlled by the pressure drop across it and by the smaller flow through its control port 5. The latter flow is derived from the line 31 through a line 33 and is controlled by the valve 6 of an all-speed governor while the pressure drop across the valve 4 is controlled according to the acceleration limits of the engine.

Under steady state conditions of operation flow to the engine is modulated by the all-speed governor valve 6 which controls the pressure of the fuel at the control port 5. This flow is derived from the main flow via the filter 10. The fixed orifice 26 ensures that the control pressure at the port 5 is sufficiently above the pressure inside the vortex chamber of the valve 4 to keep the valve operating within the range in which the control flow is effective in modulating the main flow. The valve 6 is positioned by a centrifugal governor 7, the centrifugal force of which is opposed by a spring 8, the compression of which can be varied by the pilot's throttle control lever 9. When the pilot operates the lever 9 to demand an increase in speed, the spring 8 is compressed and the valve 6 moves so as to reduce the flow through the control port 5. This allows more fuel to pass through the vortex valve 4 to the engine which is thus caused to accelerate. This increases the centrifugal force developed by the governor 7, thus moving the valve 6 to the right so as to increase the flow to the control port 5 and reduce the fuel flow to the engine, an equilibrium being reached when the engine speed has risen to the value at which the centrifugal force developed by the governor 7 balances the force of the spring 8. As most of the deflection of the spring 8 is derived from the displacement of the pilot's lever, the latter displacement is proportional to the square of the engine speed under equilibrium conditions.

Under conditions of acceleration, the demand signal from the all-speed governor at the control port 5 will saturate as a result of the vortex valve characteristic (see FIG. 2 in which the flow through the valve 4 is plotted as ordinates and the pressure at the port 5 as abscissae). The vortex valve 4 then behaves as a fixed orifice and the flow through it is controlled solely by the pressure drop across it. This pressure drop is so controlled as described below, as a function of engine speed $N_H$ and of two pressures $P_3$ and $P_4$ derived from the compressor of the engine, that the flow to the engine cannot exceed the limit permissible during acceleration, this being correctly scheduled for all conditions of engine intake pressure and temperature by using the above parameters.

A small fraction of the main flow is taken from the filter 10, through a line 11 which contains a valve 12, to a chamber 13, in which it exerts pressure on the undersurface of a diaphragm 14, the upper surface of which is subjected to the pressure downstream of the vortex valve 4. The flow is discharged from the chamber 13 through a nozzle 15, the effective outlet area of which is controlled by the position of the diaphragm so as to maintain equality between the pressures acting on opposite sides of the diaphragm 14. Accordingly, since the valve 12 and the vortex valve 4 have a common upstream pressure, the pressure drop across the valve 12 will be equal to the pressure drop across the vortex valve 4. Consequently the flow through the vortex valve 4 will be proportional to the flow through the valve 12 so long as the effective open area of the valve 12 remains constant (which is the normal operating case) and so long as the pressure at the control port 5 is at its saturation value which, as explained above, occurs during limiting accelerating conditions.

The flow through the valve 12 is controlled by the area of opening of a valve 16 and the pressure drop across the valve 16. This pressure drop is controlled by the pressure regulating vortex valve 17 which regulates the delivery pressure to and hence the flow through both the vortex valve 4 and the valve 12. The area of opening of the valve 16 is controlled by two capsule stacks in series. One of these stacks 27 is evacuated and the other 18 is subjected internally to the compressor pressure $P_3$. Both stacks are subjected externally to a pressure $Px$ which is formed by discharging air at compressor pressure $P_4$ to pressure $P_3$ through two fixed orifices 19 and 20 in series, $Px$ being the pressure between these two orifices. This gives a capsule deflection proportional to $2Px-P_3$. The pressure drop across the valve 16 is sensed by a diaphragm 21 which is acted upon by the force arising from a centrifugal governor 22, the balance between these two forces being achieved by the pressure controlling the vortex valve 17 as will now be described. If a disturbance causes the pressure drop across the valve 16 to exceed the demanded value, the diaphragm 21 moves to cause a valve 34 to allow an increased discharge of fuel through a nozzle 23 to which fuel flows through a fixed orifice 24 from the filter 10. The increased discharge of fuel through the nozzle 23 results in a reduced discharge of fuel through the control port 25 of the vortex pressure regulating valve 17 and this in turn allows more fuel to pass through the valve 17 back to the inlet of the pump 3, so reducing the delivery pressure to the valves 4 and 12 and the flow through these valves until the pressure drop across the valve 16 is restored to the demanded value. At the same time the diaphragm 14 will be adjusting the pressure drop through the nozzle 15 to ensure that the pressure drop across the valves 4 and 12 remains equal. Under conditions of acceleration, i.e., when the flow through the control port 5 of the valve 4 is saturated, the flow through the valve 12 and hence through the valve 4 is inversely proportional to the engine speed as measured at the governor 22, because this provides a pressure drop which is proportional to the square of engine speed and therefore a flow which is directly proportional to engine speed and also a function of $2P_x - P_3$ determined by the profile of the valve 16. This results in a satisfactory "nondimensional" acceleration control system.

Under some conditions of engine operation, the safe operating limits for certain other parameters, e.g., the speed of another shaft or turbine inlet pressure, may be exceeded unless the fuel flow is reduced as these limits are approached. This control is effected by the valve 12, which is open by an electronic unit when any such limit is approached, so reducing the flow to the engine through the valve 4.

The above-described control system passes the main fuel flow exclusively through valves which have no moving parts. This reduces the sensitivity to contamination and the risk of sticking as compared with systems employing valves which have moving parts. It also gives a reduction in weight and volume, since operation in fuel of such other valves makes it necessary for the valves to be spun or to be provided with bulky devices to ensure appreciable operating forces so as to give a reasonable degree of reliability. The fuel passing through the smaller orifices and those valves in the above-described system which have moving parts is cleaned by the velocity cleaned filter 10 which, being continuously washed by the main flow passing through it to the engine, does not require any maintenance. The control system does not therefore require filters which have to be cleaned.

The system shown in FIG. 3 is generally similar to that in FIG. 1, like parts in both systems being denoted by corresponding numerals. Again a vortex valve 4 acts as the metering valve, flow through it at any particular pressure drop across it being determined by the flow through and the pressure at its control port 5, this in turn being controlled by the action of the valve 6, flyweights 7, spring 8 and pilot's lever 9 which constitute the all-speed governor.

The metering pressure, i.e., the pressure drop across the valve 4, is again controlled as a function of the acceleration limits of the engine. Pressure control is effected by throttling the flow by means of a further vortex valve 17 in series with the pump 1 and the valve 4, instead of by using the valve 17 to bypass fuel as in FIG. 1. A small flow is taken off through the velocity cleaned filter 10, a fixed orifice 49 and the nozzle 15, the diaphragm 14 moving so as to control the discharge through the nozzle 15 to equalize the pressures across the diaphragm. Accordingly, in the steady state, the pressure in the chamber 13 will be equal to the pressure downstream of the metering valve 4, i.e., the pressure drop across the fixed orifice 49 will be equal to the pressure drop across the metering valve 4, together with a fixed orifice 26 which is introduced to maintain the control pressure for the valve 4. The remainder of the system operates to control the flow through the fixed orifice 49 by metering the flow through the valve 16 which is in series with it. The area of opening of the valve 16 is controlled according to the same schedule of compressor pressures $P_4$ and $P_3$ as in FIG. 1 and the pressure drop across it, which also appears across the diaphragm 21, is controlled according to engine speed by being balanced against the centrifugal force generated by the flyweights 22, any error causing the movement of a valve 47 which adjusts the pressure at and flow through the control port 25 of the pressure regulating valve 17 so adjusting the throttling action, i.e., the pressure drop across the valve 47, until the pressure drop across the valve 4 is restored to that value which gives equilibrium at the diaphragms 14 and 21. This as previously limits the maximum flow which can be delivered to the engine as a function of the compressor pressures $P_4$ and $P_3$ and of engine speed.

What we claim as our invention and desire to secure by Letters Patent is:

1. A fuel supply system for a gas turbine engine which comprises a fluidic vortex valve which meters the flow of fuel delivered by a pump to the main burner of the engine, a governor controllable by the pilot which adjusts the pressure of fuel at the control port of the vortex valve to maintain during steady state conditions the engine at a speed determined by the governor, and means operable during periods of acceleration and when the flow through the control port of the metering vortex valve is saturated to vary the pressure drop across the metering vortex valve, as a function of engine speed and compressor pressure, so that the flow of fuel to the engine cannot exceed a limit permissible during acceleration.

2. A system as claimed in claim 1, in which the control during periods of acceleration is effected by a fluidic pressure regulating vortex valve, which operates to return fluid from the delivery side to the suction side of the pump and the flow of fuel to the control port of which is controlled jointly by a governor and by a valve, the opening of which is controlled as a function of compressor pressure.

3. A system as claimed in claim 1, in which the control during periods of acceleration is controlled by a fluidic pressure regulating vortex valve, which is situated in series with the pump and the metering vortex valve and is operative to throttle the flow of fuel to the metering vortex valve and the flow of fuel to the control port of which is controlled jointly by a governor and by a valve, the opening of which is controlled as a function of compressor pressure.

4. A system as claimed in claim 2, in which the governor and the valve jointly control flow of fuel from the control port of the fluidic pressure regulating vortex valve to the inlet side of the pump.

5. A system as claimed in claim 2, wherein the position of the valve is controlled by two stacks of capsules, one evacuated and the other subject internally to a compressor pressure, the stacks of capsules being subjected externally to a higher compressor pressure.

* * * * *